(12) United States Patent
Ostrowski et al.

(10) Patent No.: US 6,377,908 B1
(45) Date of Patent: Apr. 23, 2002

(54) METHOD FOR OPTIMIZING TRANSFER FUNCTION OUTPUTS

(75) Inventors: Michael Charles Ostrowski, Glenville; Mohamed Ahmed Ali, Niskayuna; Bijan Dorri, Clifton Park, all of NY (US); Michael Solomon Idelchik, Mequon, WI (US); Arlie Russell Martin, Ballston Spa, NY (US); Douglas J. Snyder, Brookfield, WI (US)

(73) Assignee: General Electric Company, Schenectady, NY (US)

(\*) Notice: Subject to any disclaimer, the term of this patent is extended or adjusted under 35 U.S.C. 154(b) by 0 days.

(21) Appl. No.: 09/312,689

(22) Filed: May 14, 1999

(51) Int. Cl.$^7$ ............................................... G06F 17/10
(52) U.S. Cl. ........................................... 703/2; 700/30
(58) Field of Search ............................... 703/2; 700/28, 700/29, 30, 33; 708/174, 400

(56) References Cited

U.S. PATENT DOCUMENTS 5,179,528 A * 1/1993 Robertson et al. .......... 709/203
5,347,446 A * 9/1994 Iino et al. ..................... 700/44
5,477,444 A * 12/1995 Bhat et al. .................... 700/48

OTHER PUBLICATIONS

Rodriquez, A. H/sup /spl infin// Optimization for Stable Multivariable Infinite–Dimensional Systems, Proceedings of the 33rd IEEE Conference on Decision and Control, 1994, pp. 1350–1355.*

Rhyne, T. L., "Computer Optimization of Transducer Transfer Function Using Constraints on Bandwidth, Ripple and Loss", IEEE Transactions on Ultrasonics, Ferroelectrics and Frequency Control, vol. 43, Issue 6, pp. 1136–1149, Nov. 1996.*

Guillaume et al., "Parametric Identification of Two–Port Models in the Frequency Domain", IEEE Transactions on Instrumentation and Measurement, vol. 41, Issue 2, pp. 233–239, Apr. 1992.*

Guo et al., "Optimal Reduced–Order Models for Unstable and Nonminimum–phase Systems", IEEE Transactions on Circuits and Systems I: Fundamental Theory and Applications, vol. 43, Issue 9, pp. 800–805, Sep. 1996.*

Sankarayya et al., "Optimizing Computations in a Transposed Direct Form Realization of Floating–Point LTI–FIR Systems", IEEE/ACM International Conference on Computer Aided Design, pp. 120–125, Nov. 1997.*

Grasse et al., "Regularity Properties of the Phase for Mulitvariable Systems", Proc. IEEE Conference on Decisionand Control, vol. 4, pp. 3773–3778, Dec. 1997.*

Keel et al., "Robust Control with Structure Perturbations", IEEE Transactions on Automatic Control, vol. 33, Issue 1, pp. 68–78, Jan. 1988.*

\* cited by examiner

*Primary Examiner*—Russell W. Frejd
(74) *Attorney, Agent, or Firm*—Lester R. Hale; Donald S. Ingraham

(57) ABSTRACT

A product design tradeoff method is provided. A transfer function, which generates an output in response to an input is obtained. A type of optimization to be performed is identified and the input to the transfer function is perturbed in order to achieve the type of optimization identified. Output information representing the output of the transfer function is then generated to provide the user with the result of the optimization. Generating the output information comprises generating a sensitivity matrix. The sensitivity matrix comprises a plurality of sensitivity values that indicates a relationship between a change in input versus a change in output, wherein each of the sensitivity values provides a corresponding numerical value for comparing an effect of the change in the input versus the change in the output.

22 Claims, 5 Drawing Sheets

| *Fig. 2A* | *Fig. 2B* |

| Y's (Response) | Y1 | Y2 | |
|---|---|---|---|
| Importance | 1 | 1 | 202 |
| LSL | 8 | 32 | 204 |
| USL | 21 | 64 | 206 |
| Mean | 13.39484018 | 41.45408276 | |
| Std Dev | 2.922822095 | 5.093712097 | |
| R-SQ Adjusted | 96.70% | 99.30% | 208 |
| Short/Long Term | Short Term ▽ | Short Term ▽ | 209 |
| Quantity | | | 210 |
| DMPO | 348311.0213 | 394730.1033 | |
| Zst | 1.889884462 | 1.767011728 | |
| Overall Z | 0.847251105 | | |

200

| Factors | Linear Coefficients | Linear with Interactions Coefficients |
|---|---|---|
| Constant | 12 | 45.8 |
| X1 | 2.2 | 1.2 |
| X2 | 1.1 | -0.7 |
| X3 | -4 | 5.8 |
| X1' X2 | | 3.75 |
| X1' X3 | | 0.3 |
| X1' X3 | | -0.35 |

302 Linear
304 Linear with Interactions
300

| CTQ | Importance | LSL | USL | Mean | Std Dev | R-Squared Adjusted |
|---|---|---|---|---|---|---|
| y1 | 1 | 8 | 21 | 13.8948402 | 2.9228221 | 0.957 |
| y2 | 1 | 32 | 54 | 41.4540828 | 5.0937121 | 0.993 |

| | Short/Long Term | Quantity | DMPO | Zst |
|---|---|---|---|---|
| y1 | Short Term | 0 | 348311.021 | 1.88988446 |
| y2 | Short Term | 0 | 394730.103 | 1.76701173 |
| | | | Overall Z | 0.84725111 |

| | y1 | y2 |
|---|---|---|
| x1 | -610.389 | -93524.8 |
| x2 | 1077.506 | 164339.6 |
| x3 | -1209.57 | -183861 |

| | y1 | y2 |
|---|---|---|
| x1 | 5652.143 | 43690781 |
| x2 | 8494.043 | 65057247 |
| x3 | 83918.27 | 6.38E+08 |

602 ⤴   604 ⤴

METHOD FOR OPTIMIZING TRANSFER FUNCTION OUTPUTS

BACKGROUND OF THE INVENTION

The invention relates to a product design tradeoff method. An existing design methodology for improving product quality is the design for six sigma (DFSS) process. One component of DFSS is the development of transfer functions to represent the response surface of the design space of interest. A transfer function may represent the product at a variety of levels (e.g. component, sub-assembly, assembly, entire product, etc.). There are various tools to create transfer functions from a DOE (Design of Experiments) using regression methods, but there is a need for further developing and optimizing transfer functions.

BRIEF SUMMARY OF THE INVENTION

An exemplary embodiment of the invention is directed to a product design tradeoff method. A transfer function, which generates an (meaning at least one) output in response to an (meaning at least one) input is obtained. A type of optimization to be performed is identified and the input to the transfer function is perturbed in order to achieve the type of optimization identified. Output information representing the output of the transfer function is generated to provide the user with the result of the optimization. Generating the output information comprises generating a sensitivity matrix. The sensitivity matrix comprises a plurality of sensitivity values that indicates a relationship between a change in input versus a change in output, wherein each of the sensitivity values provides a corresponding numerical value for comparing an effect of the change in the input versus the change in the output.

BRIEF DESCRIPTION OF THE DRAWINGS

Referring now to the drawings wherein like elements are numbered alike in the several Figures:

FIGS. 2A and 2B are partial views of the matrices shown in FIG. 2 in an exemplary embodiment of the invention;

FIGS. 3–6 depict matrices including output information; and

DETAILED DESCRIPTION OF THE INVENTION

Figures 1, 2:
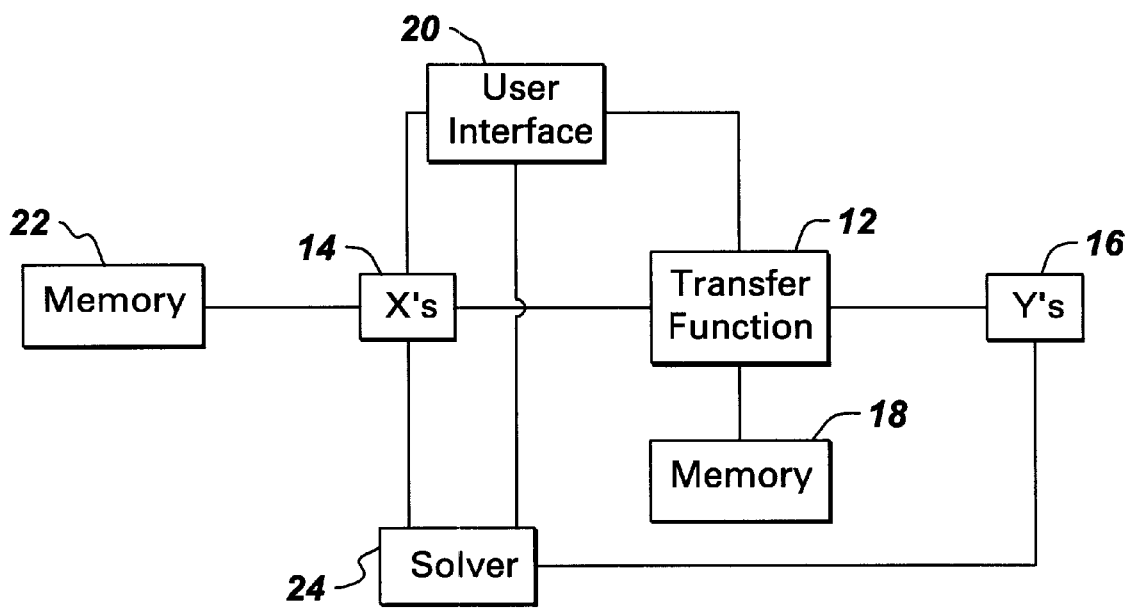
FIG. 1 is a block diagram of an exemplary embodiment of the invention.
FIG. 2 depicts a plurality of matrices in an exemplary embodiment of the invention.

FIG. 1 is a block diagram representing an exemplary embodiment of the invention. As shown in FIG. 1, transfer functions 12 receive inputs 14 (also referred to as X's) and generate outputs 16 (also referred to as Y's). The transfer functions may be implemented on a general purpose computer programmed to solve the transfer function equations that relate the X's to the Y's. The transfer functions 12 may be retrieved from a memory 18 (e.g., random access memory) and may also be edited through a user interface 20 as described herein with reference to FIG. 2. The transfer functions contain the coefficients for each input, including constants, general terms via formulas, and any optional transformation which can be applied to the resulting transfer function value (e.g., log transformation). The terms of each transfer function include the inputs themselves (linear terms), 2-level interactions between parameters and quadratic terms, along with the ability to specify any combination of terms and powers as described below with reference to FIG. 2.

The inputs 14 of FIG. 1 to the transfer functions 12 may be retrieved from a memory 22 (which may be the same device as memory 18) or defined/edited by the user through user interface 20. As described in detail herein, a solver 24 (such as an EXCEL solver program) allows the output 16 to be optimized based on user input. The solver 24 may be implemented on the general purpose computer. The solver 24 perturbs the inputs 14 until outputs 16 have been optimized as defined by the user. The user can specify types of optimization through the user interface 20.

Figure 2A:
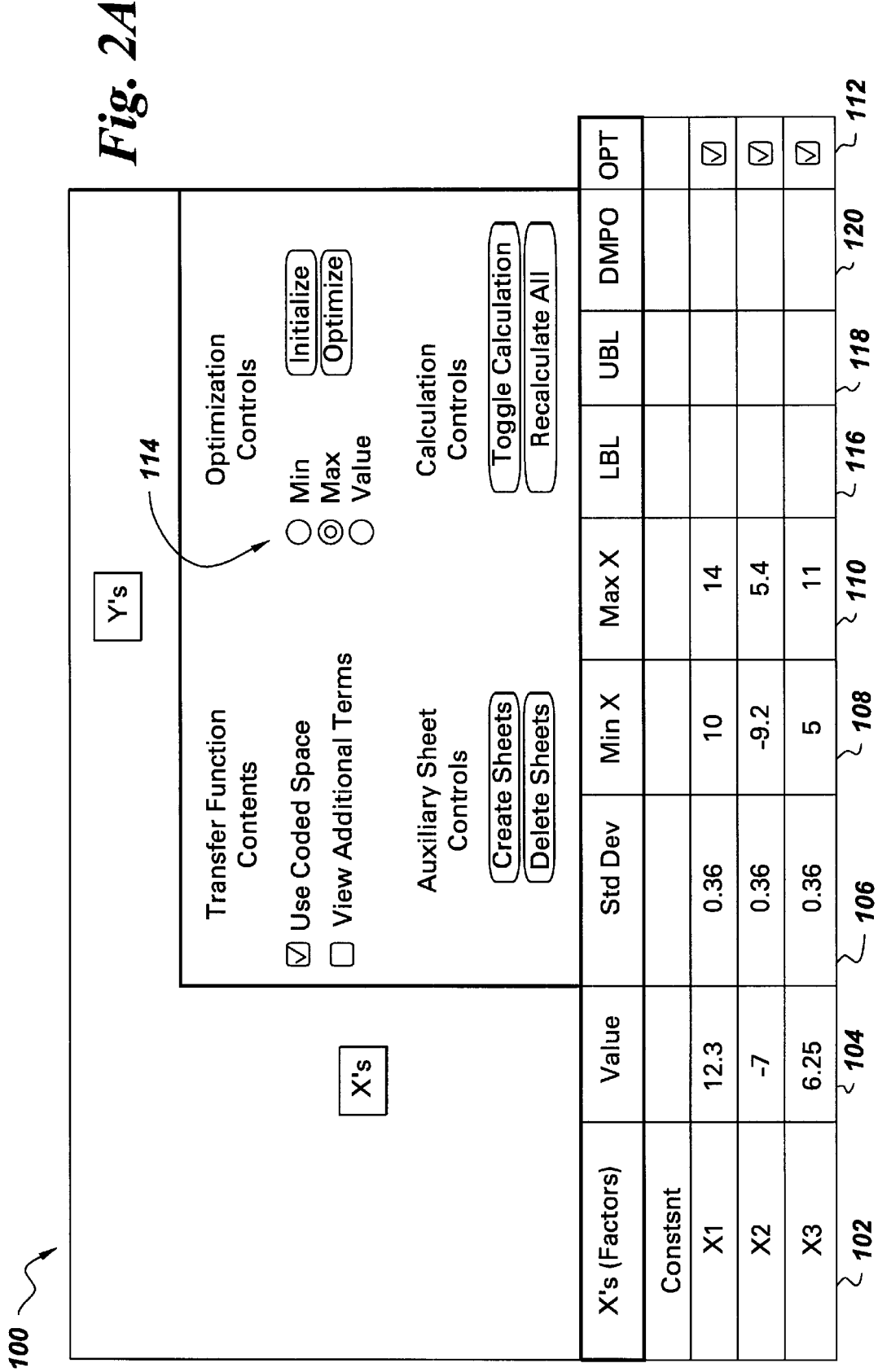

An exemplary implementation of the invention is shown in FIG. 2, with its detailed partial views shown in FIGS. 2A and 2B. FIG. 2A depicts a transfer function matrix 100. FIG. 2B depicts an output an output (or Y's) matrix 200 and a power matrix 300. The transfer function matrix 100 of FIG. 2A is the tool that allows the user to provide input related to the inputs 14 of FIG. 2A and specify the type of optimization to be performed by solver 24. The transfer function matrix 100 includes a column of the inputs 102 which are applied to the transfer functions 12 of FIG. 1. The inputs 102 of FIG. 2A may correspond to a distribution of values. For example, if an input 102 represents the thickness of a seal for use in refrigerator, it can be represented by a distribution of thickness values. This more accurately represents the actual seal thickness due to manufacturing variances. Columns 104–110 contain statistical information regarding the distribution of inputs in column 102. Shown in columns 104–110 are mean value (Value), standard deviation (Std. Dev.), minimum input value (Min X) and maximum input value (Max X). Columns are also provided for the lower specified limit 116 (LSL), upper specified limit 118 (USL) and defects per million opportunities 120 (DPMO). As described above, the X or input values can be entered by the user through the transfer function matrix 100 or extracted from an existing spreadsheet or database stored in memory 22 of FIG. 1.

The transfer function matrix 100 of FIG. 2A also provides a tool for the user to provide input to the solver 24 of FIG. 1. Transfer function matrix 100 of FIG. 2A includes an optimization column 112 (labeled Opt), which includes a box the user can check to designate whether an input in column 102 should be varied to optimize an output. The user can also specify the type of optimization to be performed through optimization controls 114. The user can select that an output or outputs be minimized, maximized or set to a specific value. The user may also request that the defects per million opportunities (DPMO) be minimized thereby maximizing the transfer function Z value described herein with reference to output matrix 200 of FIG. 2B. Once the transfer function matrix 100 of FIG. 2A has been populated, solver 24 of FIG. 1 automatically perturbs the input values to reach the target solution. This permits the optimization of a single transfer function or all transfer functions. Alternatively the user can experiment with variations of the transfer function or transformations on the transfer function to examine different response surface concepts.

The output matrix 200 of FIG. 2B allows the user to specify characteristics of the outputs or Y's. Each output variable is placed in column as shown by values y1 and y2 in output matrix 200. Entries in rows 202–210 of each column may be altered by the user. An importance row 202 includes a numerical indicator of the degree of importance of the output. Importance factors represent how important an output is to the overall goals of the product. For example, in a refrigerator, the consumer may place more emphasis on efficiency than the refrigerator noise. Thus, the efficiency would have a higher importance than refrigerator noise.

Rows 204 and 206 contain the lower specified limit (LSL) and upper specified limit (USL) for each output. These limits identify constraints on the outputs that the user may impose on the transfer functions. For example, there may be a maximum refrigerator noise that consumers could tolerate. The user may use one or both of the LSL and USL to set limits on the transfer function output. The solver 24 of FIG. 1 may generate a result that exceeds the LSL and/or the USL. This will result in a higher defect per million opportunities (DPMO) and a lower Z value described below.

Row 208 of FIG. 2B contains an $R^2$ value for each output. The $R^2$ value is a measure of the quality of the regression used to produce the transfer function for each output. Row 209 contains a designation of short term or long term for each output. This parameter allows the user to specify the type of calculation to perform when determining the defects per million opportunities which is related to both the Z value for each output (Zst) and the overall Z value for all outputs (i.e., the Z value for all transfer functions). The Zst and Z values are indicators of the degree of error in the outputs where a higher Z value indicates a lower amount of error in the outputs. The Z values represent normalized error (i.e. normalized by the standard deviation of error) so that Z values for each output may be easily compared. The Z value may be computed by (SL−Mean Error)/Std. Dev. Error where SL is a specified value for the design (either a upper specific limit, lower specified limit or target), mean error is the average error between the output and SL and Std. Dev. Error is the standard deviation of the error. The Quantity row 210 allows the user to specify the number of samples to use in determining the statistical data for each output. If no Quantity is specified, a default number of samples is used.

The remaining rows labeled Mean, Std. Dev., DPMO, Zst and Overall Z are computed by the process and are not modifiable by the user. The Mean row contains the average value for each output. The Std. Dev. row contains the standard deviation for each output. The DPMO (defects per million opportunities) represents the number of times the output exceeded either the LSL or USL per one million opportunities. The Zst row contains a Z value for each output (i.e. each transfer function) indicating the degree of error (how well the output fits LSL and the USL) for each output, where a high Z value indicates less error. The final entry is an overall Z value computed for all outputs and thus, is a Z value for all the transfer functions.

The power matrix 300 provides a tool through which the user can provide input related to the transfer functions 12 of FIG. 1. Each row of the power matrix 300 of FIG. 2B corresponds to a factor or combination of factors from column 102 of FIG. 2A of the transfer function matrix 100. Column 302 of FIG. 2B of the power matrix 300 contains coefficients relating to the simple terms (x1, x2, x3). Column 304 of the power matrix 300 contains coefficients for two-way interactions of the simple terms (x1x2, x1x3, x2x3). Additional coefficients may also be supported such as quadratics, three-way interactions, cubics, etc. The coefficients of the transfer function provided in columns 302 and 304 are typically imported from a regression function, spreadsheet or database. The power matrix 300 may also be edited by the user to alter coefficients in column 302 or 304.

Once the user modifiable entries in the transfer function matrix 100 of FIG. 2A, output matrix 200 of FIG. 2B and power matrix 300 have been populated (either from memory or from the user), the transfer function 12 of FIG. 1 then generates the outputs using the inputs, the coefficients of the transfer function from the power matrix 300 of FIG. 2B, and any additional terms. The output matrix 200 is completed by computing the mean and standard deviation of the outputs. The outputs, in conjunction with the upper and lower specified limits, permit the calculation of DPMO, and subsequently, a Zst value for each output and an overall Z value as described above.

After the transfer function output has been optimized, output information is provided to the user in the form of a plurality of output matrices which are generated and maintained as shown in FIGS. 3–6. FIG. 3 depicts a summary scorecard 400 which displays the information in output matrix 200 in a concise format. FIG. 4 depicts a sensitivity matrix 500 having rows 502 including the inputs (or X's) and columns 504 including the outputs (or Y's). A sensitivity value is stored at each point in the matrix indicating the relationship between change in input versus change in output for each combination of input/output. The sensitivity values provide a numerical value for comparing the effect of changes in the inputs to changes in the outputs.

FIG. 5 depicts a variance participation matrix 600 having rows 602 including the inputs (or X's) and columns 604 including the outputs (or Y's). A variance participation value is stored at each point in the matrix 600 indicating the effect that each input has on the variance of each output. The variance participation values provide a quantitative or relative indicator of the effect of each input on the variance of each output. Often the goal of a design is to minimize variation in an output variable. The variance participation matrix allows the user to visualize the effect that each input has on the variance of each output which can guide control of each input.

Figure 6:
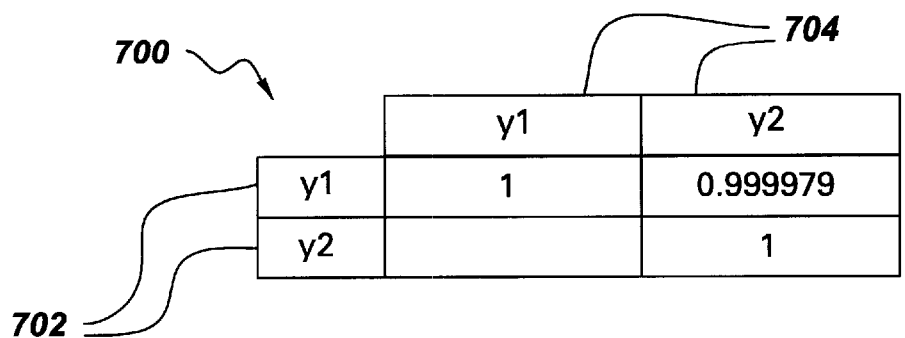

FIG. 6 depicts a correlation matrix 700 having rows 702 including the outputs and columns 704 including the outputs. A correlation value is stored at each point in the matrix 700 representing the degree of correlation between the outputs. A value of 1 indicates that the outputs are highly correlated and a value of 0 indicates that the outputs are not correlated at all. The correlation value at intersections of the same output (e.g., y1/y1) is 1.

Figure 7:
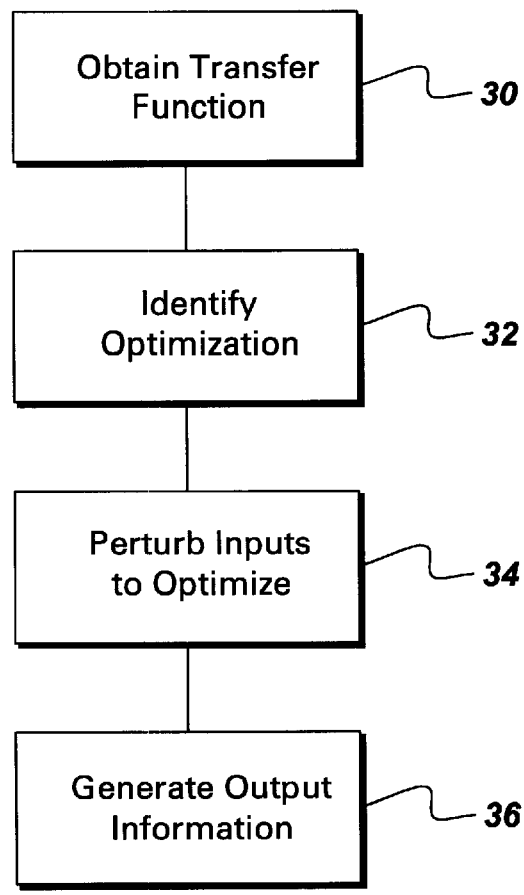
FIG. 7 is a flowchart of an exemplary embodiment of the invention.

FIG. 7 is a flowchart of a method for optimizing a transfer function output in an exemplary embodiment of the invention. At step 30, the transfer function parameters are obtained. As described above, the transfer function parameters include the inputs to the transfer function matrix 100 and the power matrix 300. The transfer function parameters may be retrieved from memory and/or edited by the user through the user interface. At step 32, the type of optimization is identified based on user input and may include optimizing the value of an output (Y) or optimizing a characteristic of the output (e.g., DPMO). At step 34, the inputs to the transfer function are perturbed until the specified optimization is obtained. Output information corresponding to the outputs (Y's) and performance of the transfer function output optimization is provided at step 36.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the exemplary embodiment disclosed, but that the invention will include all embodiments falling within the scope of the appended claims.

What is claimed is:

1. A product design tradeoff method comprising:
    obtaining a transfer function which generates an output in response to an input;
    identifying a type of optimization to be performed;
    perturbing the input to the transfer function in order to achieve the type of optimization identified; and
    generating output information representing the output of the transfer function once the identified type of optimization has been achieved, wherein generating the output information comprises generating a sensitivity matrix comprising a plurality of sensitivity values indicating a relationship between a change in the input versus a change the output; wherein each of the sensitivity values provides a corresponding numerical value for comparing an effect of the change in the input versus the change in the output.

2. The method of claim 1 wherein:
    said obtaining the transfer function includes retrieving a stored transfer function.

3. The method of claim 2 wherein:
    said obtaining the transfer function further includes modifying the transfer function in response to user input.

4. The method of claim 1 wherein:
    said identifying the type of optimization includes identifying an output to be maximized.

5. The method of claim 1 wherein:
    said identifying the type of optimization includes identifying an output to be minimized.

6. The method of claim 1 wherein:
    said identifying the type of optimization includes identifying an output to be equal to a specified value.

7. The method of claim 1 wherein:
    said generating output information includes generating a scorecard including statistical data related to said output.

8. The method of claim 7 wherein:
    said statistical data related to said output includes a Z value for each output.

9. The method of claim 8 wherein:
    said output includes a plurality of outputs and said statistical data includes an overall Z value related to a combination of said outputs.

10. The method of claim 1 wherein:
    said generating output information includes generating a variance participation matrix containing variance participation values indicating an effect each input has on a variance of each output.

11. The method of claim 1 wherein:
    said generating output information includes generating a correlation matrix containing correlation values indicating a degree of correlation between outputs.

12. A storage medium encoded with machine-readable computer program code for performing a product design tradeoff, the storage medium including instructions for causing a computer to implement a method comprising:
    obtaining a transfer function which generates an output in response to an input;
    identifying a type of optimization to be performed;
    perturbing the input to the transfer function in order to achieve the type of optimization identified; and
    generating output information representing the output of the transfer function once the identified type of optimization has been achieved, wherein generating the output information comprises generating a sensitivity matrix comprising a plurality of sensitivity values indicating a relationship between a change in the input versus a change the output; wherein each of the sensitivity values provides a corresponding numerical value for comparing an effect of the change in the input versus the change in the output.

13. The storage medium of claim 12 wherein:
    said obtaining the transfer function includes retrieving a stored transfer function.

14. The storage medium of claim 13 wherein:
    said obtaining the transfer function further includes modifying the transfer function in response to user input.

15. The storage medium of claim 12 wherein:
    said identifying the type of optimization includes identifying an output to be maximized.

16. The storage medium of claim 12 wherein:
    said identifying the type of optimization includes identifying an output to be minimized.

17. The storage medium of claim 12 wherein:
    said identifying the type of optimization includes identifying an output to be equal to a specified value.

18. The storage medium of claim 12 wherein:
    said generating output information includes generating a scorecard including statistical data related to said output.

19. The storage medium of claim 18 wherein:
    said statistical data related to said output includes a Z value for each output.

20. The storage medium of claim 19 wherein:
    said output includes a plurality of outputs and said statistical data includes an overall Z value related to a combination of said outputs.

21. The storage medium of claim 12 wherein:
    said generating output information includes generating a variance participation matrix containing variance participation values indicating an effect each input has on a variance of each output.

22. The storage medium of claim 12 wherein:
    said generating output information includes generating a correlation matrix containing correlation values indicating a degree of correlation between outputs.

* * * * *